United States Patent [19]

Burroughs et al.

[11] Patent Number: 5,478,665
[45] Date of Patent: Dec. 26, 1995

[54] BATTERY WITH STRENGTH INDICATOR

[75] Inventors: James R. Burroughs, Encino; Alan N. O'Kain, Corona del Mar, both of Calif.

[73] Assignee: Strategic Electronics, Reno, Nev.

[21] Appl. No.: 190,660

[22] Filed: Feb. 2, 1994

[51] Int. Cl.⁶ .................................................. H01M 10/48
[52] U.S. Cl. ........................... 429/90; 429/91; 429/92; 429/93; 324/426; 324/435; 324/437
[58] Field of Search ............................ 429/90, 91, 92, 429/93; 324/435, 426, 437

[56] References Cited

U.S. PATENT DOCUMENTS

| | | | |
|---|---|---|---|
| 945,564 | 1/1910 | Marko . | |
| 1,010,377 | 11/1911 | Kempf . | |
| 1,497,388 | 6/1924 | Sterling . | |
| 3,563,806 | 12/1967 | Hruden . | |
| 3,947,978 | 4/1976 | Clark et al. . | |
| 4,006,414 | 2/1977 | Parker | 324/106 |
| 4,048,388 | 9/1977 | Chevet | 429/91 |
| 4,057,730 | 11/1977 | Dane | 250/461 |
| 4,360,780 | 11/1982 | Skutch, Jr. | 324/437 |
| 4,371,827 | 2/1983 | Mullersman et al. | 320/48 |
| 4,379,816 | 4/1983 | Mullersman et al. | 429/91 |
| 4,497,881 | 2/1985 | Bertolino | 429/91 |
| 4,520,353 | 5/1985 | McAuliffe | 340/636 |
| 4,702,563 | 10/1987 | Parker | 350/351 |
| 4,702,564 | 10/1987 | Parker | 350/351 |
| 4,723,656 | 2/1988 | Kiernan et al. | 206/333 |
| 4,726,661 | 2/1988 | Parker | 350/351 |
| 4,727,006 | 2/1988 | Malinowski et al. | 429/50 |
| 4,737,020 | 4/1988 | Parker | 350/351 |
| 4,775,964 | 10/1988 | Alessio et al. | 368/67 |
| 4,835,475 | 5/1989 | Hanakura et al. | 324/435 |
| 4,835,476 | 5/1989 | Kurosawa | 324/435 |
| 4,855,195 | 8/1989 | Georgopoulos et al. | 429/54 |
| 4,924,176 | 5/1990 | Tremblay | 324/133 |
| 4,962,347 | 10/1990 | Burroughs et al. | 320/48 |
| 5,015,544 | 5/1991 | Burroughs et al. | 429/93 |
| 5,057,383 | 10/1991 | Sokira | 429/92 |
| 5,059,895 | 10/1991 | Cataldi et al. | 324/104 |
| 5,156,931 | 10/1992 | Burroughs et al. | 429/93 |
| 5,223,003 | 6/1993 | Tucholski et al. | 29/623.4 |
| 5,231,356 | 7/1993 | Parker | 324/435 |
| 5,240,022 | 8/1993 | Franklin | 137/1 |
| 5,250,905 | 10/1993 | Kuo et al. | 324/435 |

FOREIGN PATENT DOCUMENTS

| | | |
|---|---|---|
| 0495636 | 1/1992 | European Pat. Off. . |
| 0523901 | 1/1993 | European Pat. Off. . |
| 3100503 | 8/1982 | Germany . |

*Primary Examiner*—Stephen Kalafut
*Assistant Examiner*—M. Nuzzolillo
*Attorney, Agent, or Firm*—DeLio & Peterson

[57] ABSTRACT

A battery strength tester used on a battery which has indicating means to indicate the strength of the battery and switching means which can easily be employed to complete a circuit so as to place the indicator means across the terminals of the battery and display the charge of the battery and wherein said switch, after a predetermined interval or temperature is reached, automatically opens to break the electrical contact across the battery terminals. A light emitting material employed as the indicator material is another special feature of the battery strength tester.

15 Claims, 3 Drawing Sheets

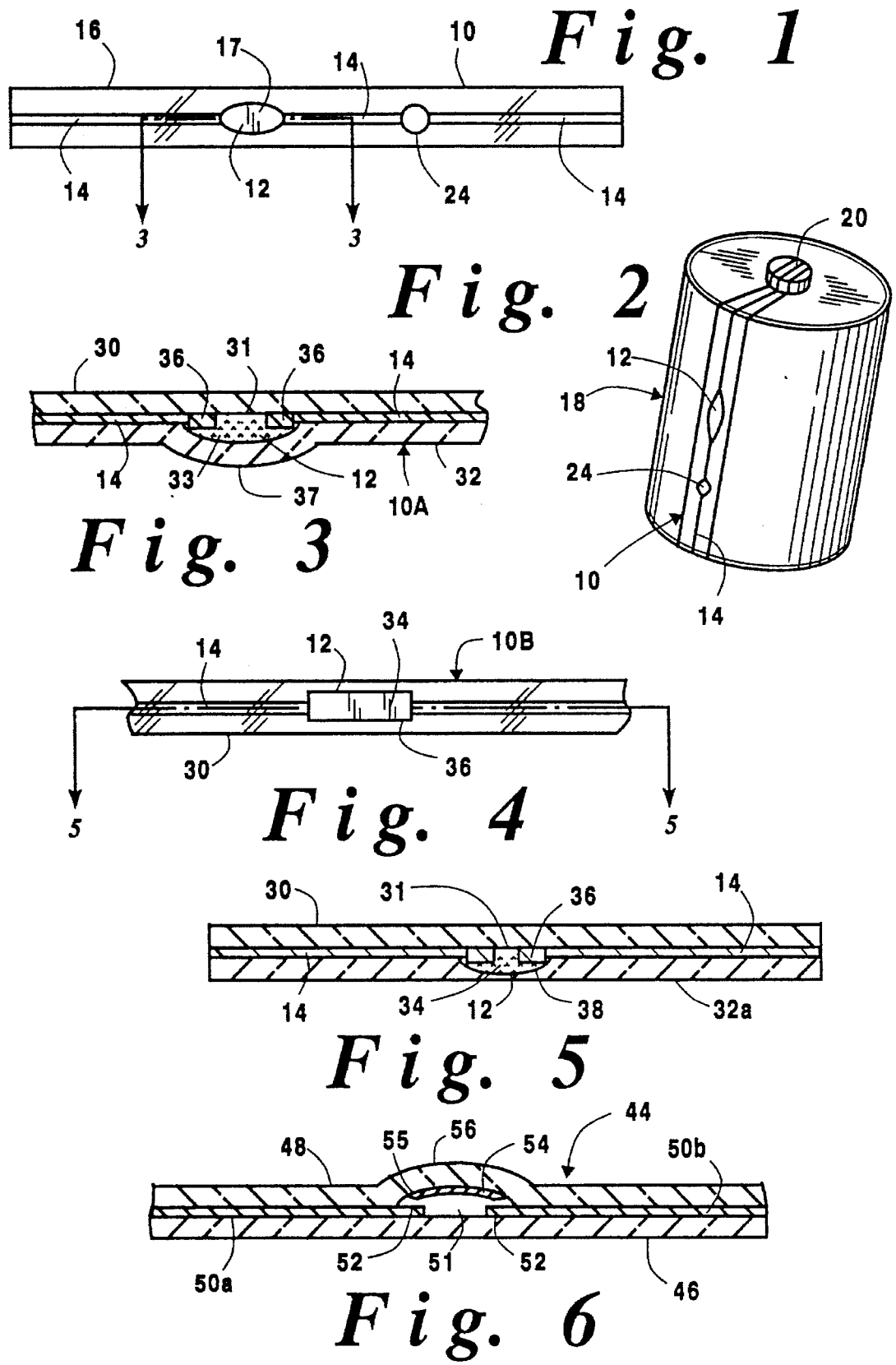

BATTERY WITH STRENGTH INDICATOR

FIELD OF THE INVENTION

The present invention relates to a battery or battery package having an improved built-in strength tester device for determining the strength, voltage, or capacity of the battery. More particularly, the present invention relates to a battery or battery package having an indicator cell controlled by a switch which, after the switch is turned on, automatically turns off after a predetermined interval, during which interval the user is provided with a visual indication of the strength of the battery.

DESCRIPTION OF RELATED ARTS

Flashlights, portable lanterns, portable radios and television, cameras, video recorders, portable dictating machines, and the like are used extensively in this country and abroad. Almost every home and business has at least one flashlight or portable lantern and a radio. Many homes and businesses have numerous devices, such as recorders, portable radios and televisions, video recorders, calculators, cameras, and the like, which utilize batteries for their energy source. Some of the devices, such as flashlights, are used on an infrequent basis, that is, during an emergency situation where there has been a power failure or when it is not convenient to use a light source powered by conventional household current, such as for outdoor use or use in an unlighted attic or crawl space. Other devices, such as portable radios, are used extensively. The majority of these battery powered devices use dry-cell nonrechargeable batteries.

Nonrechargeable alkaline batteries sold under the trademarks EVEREADY, DURACELL, RAY-OVAC, and the like, have a number of advantages over rechargeable batteries. On a weight-to-weight and volume-to-volume basis, the alkaline battery can supply three to four times the wattage of a rechargeable battery. In addition, nonrechargeable dry-cell batteries put out a higher voltage than dry-cell rechargeable batteries. Many dry-cell rechargeable batteries, even if not in use, have to be periodically charged to keep the batteries from falling below a defined charge level to prevent permanent damage to the batteries. Alkaline batteries, which are used frequently, can have a shelf or storage life of from three to five years. During this period, no maintenance of the battery is required. In contrast, most rechargeable batteries wet-cell and dry-cell will completely discharge within six months or less of their last recharge.

Most individuals test their batteries by turning on the device in which the batteries are installed. If the device operates, the individual is normally satisfied that the batteries are operational. Some individuals will test the batteries on a battery tester to determine the condition of the batteries. Some individuals will even test the batteries under both loaded and unloaded conditions to measure the voltage drop. Although it is not complicated to test batteries, it is time consuming to disassemble a device, remove the batteries, test the batteries, and, if they pass the test, reinstall the batteries in the device. It is normally not possible to test new batteries at the time of purchase because of the battery protective packaging.

The manufacturer of DURACELL-brand batteries has been date-marking its packages and batteries to indicate by which date the battery should be in use. Although this date-stamping may be of some benefit to purchasers, it does not tell the purchaser the actual condition of the battery.

A number of patents have issued which relate to "label" battery testers including U.S. Pat. Nos. 5,015,544 and 5,156,931, granted to the assignors of the present invention. Generally, the tester comprises a series of thin layers, generally a substrate layer, onto which is deposited a conductive layer that has an electric current sensitive material in contact therewith, followed by a nonconductive surface layer. When current flows through the conductive layer, the sensitive material is activated and indicates the strength of the battery. The tester is attached to the side of the battery or the battery package and is activated by depressing the tester to connect the battery to the indicator.

In most battery tester designs however, a switch is preferably employed to place the indicator in electrical contact with the battery and the lack of effective and reliable switching devices is a serious problem in the industry. In general the switch is turned on by depressing the switch device to connect two conductors which are connected to the battery terminals. The switch is held in this position until the indicator shows the battery strength at which time the pressure is released and the switch is turned off. This is shown in U.S. Pat. Nos. 5,015,544 and 5,156,931, supra. In U.S. Pat. No. 5,059,895, to Cataldi et al., the switch is turned on by applying pressure on the switch to contact a conductive layer with the surface of the battery through a hole in a dielectric substrate layer. A similar design is shown in U.S. Pat. No. 5,223,003, to Tucholski et. al. All the above patents are hereby incorporated by reference.

U.S. Pat. No. 4,520,353, to McAuliffe disclosed the use of an electronic switch to connect a battery to a test load for a short period of time and then disconnecting the battery before sensing the voltage of the battery.

In a different design, U.S. Pat. No. 5,250,905 shows a battery with a continuous electrochemical tester comprising an indicator cell containing an indicia bearing layer beneath an anode layer and as the anode disappears (is depleted) as the battery is discharged the strength of the battery is indicated.

Accordingly, it is an object of the invention to provide an improved built-in battery-strength tester which has an indicator cell containing a switch in the indicator cell or a separate switching device for the cell which tester permits one to reliably determine in a quick and effortless manner the battery's strength or condition.

It is another object of the invention to provide an improved built-in battery strength tester wherein the tester employs a switch which, after it is activated (turned on), automatically deactivates (turns off) after a predetermined interval is reached.

Other objects and advantages of the present invention will be readily apparent from the following description.

SUMMARY OF THE INVENTION

The present invention is directed to an improved battery comprising a battery and a battery-strength tester having indicator means controlled by a switching means which switch when activated is adapted to be in the on position for a predetermined interval during which the indicator is electrically connected to the battery and provides an indication of the strength of the battery. The switch means is normally in the off position and in an "on" position electrically connects and completes a circuit between the battery and the indicator means for a desired interval after which it reverts to its original off position. An electronic switch which when activated stays on for a desired interval, e.g., 3–10 seconds, then automatically shuts off may be employed. Any other switching devices which can be controlled for a certain interval may suitably be used. Likewise, any indicator means which can be activated by a flow of electric current may be employed.

In a preferred embodiment shown further herein, the improved battery having a battery strength tester comprises a dry cell battery having a first terminal and a second terminal; a battery indicator formed in a layer attached to a side of the battery which undergoes a visible change when a predetermined electric current flows through the indicator and a first conductor electrically connected between the indicator and the first battery terminal; and a battery switch comprising a resilient, nonconductive, deformable layer disposed over the side of the battery, a switch chamber formed beneath the resilient layer, and a second conductor extending from the chamber and connected to the indicator, the portion of the second conductive lead within the switch chamber comprising a switch contact, the battery switch being biased in an electrically open (off) position. Upon pressing of the resilient layer over the switch chamber, the switch contact will be plastically deformed and placed in electrical contact with a conductive layer in the chamber which is in electrical contact with the second battery terminal, thereby placing the indicator in electrical contact across the terminals of the battery to quickly indicate to the user the strength of the battery. In this improved battery embodiment, the switch conductor contact comprises a shape memory alloy which changes its internal structure at a predetermined temperature and/or interval and reverts to its original undeformed shape, disconnecting the contact and shutting off the switch.

Shape memory alloys are known and have been used in battery indicator devices in place of pyrotechnic materials or color indicating materials as discussed in U.S. Pat. No. 5,015,544, supra. There alloys are sold by TOKI AMERICAN TECHNOLOGIES, Inc. of Irvine, Calif., under the BIOMETAL mark and basically, the alloys change their internal structure at a predetermined temperature and take on an entirely new space. In general, the alloy changes its shape when physically deformed (pressing on the switch) and stays in that position until a particular temperature (e.g., by current flow therethrough) or interval is reached whereupon it reverts to its original undeformed shape.

In another preferred embodiment shown herein, the improved battery having a battery strength tester comprises a dry cell battery having a first terminal and a second terminal; a battery indicator attached to a side of the battery which undergoes a visible change when a predetermined electric current flows through the indicator and a first conductor electrically connected between the indicator and the first battery terminal; and a battery switch comprising a resilient, nonconductive, deformable layer disposed over the side of the battery, a switch chamber formed beneath the resilient layer, a second conductor extending from one end of the chamber to the indicator, and a third conductor extending from the other end of the chamber to the second battery terminal, the battery switch being biased in an electrically open position. Either or both of the second and third conductors being a shape memory alloy and upon pressing of the resilient layer over the switch chamber, the alloy is physically deformed and the second and third conductor make contact and place the indicator in electrical contact across the terminals of the battery to indicate to the user the strength of the battery, and then the alloy releases to its undeformed shape at a predetermined temperature and/or interval to the original off (open) position.

In yet another embodiment, the invention is directed to a strip or label battery strength tester for application to a battery which includes an integral battery-strength indicator or voltmeter which comprises a first nonconductive insulating or dielectric base layer and a conductive layer above and in contact with the base layer. A nonconductive insulating or dielectric layer may be provided over and in contact with the conductive layer. A heat (temperature), current sensitive or other, color indicating material contacts the conductive layer. For a heat sensitive material the conductive layer has sufficient heat generating capacity when subject to a predetermined voltage or current to cause a color change in the temperature sensitive, color indicating material. The conductive layer is preferably formed with a reduced cross sectional area to have a resistance such that current flow at a minimum predetermined voltage through the conductive layer will raise the area to a predetermined temperature. The base layer is of sufficient thickness to provide thermal insulation to overcome heat sinking under the conductive layer and permit the temperature sensitive, color indicating material to function when the strip containing the battery strength indicator or voltmeter is applied to the side or housing of a battery, which battery typically has an electrically conductive housing. The strip comprising the battery-strength indicator or voltmeter also includes a switch means comprising an electronic timing switch and/or a shape memory alloy adapted to make electrical contact with the terminals of the battery for a predetermined interval.

One embodiment of the switch means of the present invention comprises a nonconductive base layer; a resilient nonconductive top layer attached to the base layer, a portion of the top and base layers forming a chamber having first and second internal spaced apart opposing walls; a first conductive contact means on the first internal wall of the chamber; a second conductive contact means on the second internal wall of the chamber; first and second conductive layers independently and separately sandwiched between the top layer and the base layer and connected to the first and second contact means respectively, the top layer about the chamber adapted to be pushed toward the base layer so that the first and second contact means come in contact to permit current to flow from the first conductive means to the second conductive means. Either or both the first and second contact means being a shape memory alloy.

In an alternative embodiment of the switch means of the present invention, the switch means comprises a nonconductive base layer; a resilient nonconductive top layer attached to the base layer, a portion of the top and base layers forming a chamber having first and second internal spaced apart opposing walls; first and second spaced apart conductive contact means on the first internal wall of the switch chamber; third conductive contact means on the second internal wall of the chamber; and first and second conductive means independently and separately sandwiched between the top layer and base layer and connected to the first and second conductive contact means respectively, the top layer about the chamber adapted to be pushed toward the base layer so that the third conductive contact means contacts the first and second conductive contact means to complete an electrical connection with the first and second conductive means. Any one or all of the first, second or third conductive contact means can be a shape memory alloy, with it being preferred that the third conductive contact means be a shape memory alloy.

A battery-strength indicator means which can be used with the present invention comprises a nonconductive base layer; a nonconductive top layer attached to the base layer, a portion of the top layer and base layer forming a chamber therebetween; first and second conductive means separately and independently positioned between the top layer and the base layer and extending into the chamber, the ends of the conductive means in the sealed chamber forming electrodes, the other ends of the conductive means adapted to electrically connect to the battery; and indicator means in the sealed chamber adapted to undergo a visible change when the voltage potential across the electrode exceed or crosses a predetermined voltage. The indicator means can be a liquid-crystal composition that changes phases when the field between the electrodes or plates exceeds or crosses a predetermined voltage value. Preferably the chamber is sealed.

In an alternative embodiment of an indicator which can be used with the present invention, the battery strength indicator means comprises a first nonconductive layer; a second nonconductive layer attached to the first layer, a portion of the first and second layers forming a chamber therebetween, the chamber having first and second internal opposing walls; a third nonconductive layer having a high dielectric constant attached to the first layer; a first conductive plate means sandwiched between the third insulating layer and the first layer and isolated from the chamber; a second conductive plate means on the second internal wall; first and second conductive means separately and independently positioned between the first and third and first and second nonconductive layers, the ends of the conductive means electrically connected to the first and second conductive plate means respectively, the other ends of the conductive means adapted to be electrically connected to the battery; and a liquid-crystal composition in the sealed chamber adapted to undergo a visible phase change when the electric field between the first and second plate means exceeds or crosses a predetermined value. Preferably the chamber is sealed.

In another indicator means which can be used with the switch of the present invention, the battery-strength indicator means comprises a first nonconductive layer; a second nonconductive layer attached to the first nonconductive layer, a portion of the first and second nonconductive layers forming a chamber therebetween; a conductive layer sandwiched between the first and second nonconductive layers, the conductive layer reduced to a small cross-sectional area in the chamber; and a heat sensitive color-indicating material in the sealed chamber that is adapted to undergo a color change when its temperature exceeds or crosses a predetermined value, the conductive layer in the chamber rising to a predetermined temperature when the voltage of the current flowing therethrough exceeds a predetermined value.

Another indicator means which can be used with the switch of the present invention employs materials therein which emit light (illuminate) when the switch is activated and current flows through the indicator. Such materials may be activated by, e.g., heat generated by the current flow or by a voltage potential established between electrodes in the indicator cell.

One example of such a light emitting material is shown in U.S. Pat. No. 4,775,964, which patent is hereby incorporated by reference. Basically, an electroluminescent device is shown whereby two (2) electrodes separate an electroluminescent layer comprising a phosphor which may be in a binder such as an epoxy resin. The resulting device is essentially a capacitive circuit element and when an alternating or pulsed voltage is applied across the two electrodes, the phosphor will illuminate or emit light in various colors depending on the phosphor employed. Generally, the phosphor materials are about 10 to 25 microns and the polymeric binder is an epoxy resin (e.g., of the bisphenol-A class) which exhibit low electrical losses and moisture resistant qualities when cured. An example of a phosphor/binder mixture comprises 2.5 parts GTE Sylvania No. 727 phosphor, screened and graded to particle sizes between 10 to 25 microns, mixed with one part, by volume, of a heat curable bisphenol-A epoxy binder, commercially obtainable as ABELBOND 681-14 from Abelstick Laboratories.

The invention also comprises an improved battery package having a battery-strength tester means comprising at least one battery; a battery-strength indicator means comprising a battery-strength indicator device for indicating the strength of the battery when electrically connected to the battery; and a predetermined interval (e.g., timing or temperature responsive) switching conductive means adapted to electrically connect the indicator device to the battery; and packaging means for the battery and battery-strength tester means.

The deformable, nonconductive strip layer or layers employed in connection with the battery strength indicator and switch may be made of plastic film such as adhesive tape for application to the battery housing or battery packaging. Preferably the chambers of the battery strength indicators and switches are sealed chambers and the plastic film thermally insulating to prevent heat sinking.

BREIF DESCRIPTION OF THE DRAWINGS

FIG. 1 is a top view of a battery-strength tester device of the present invention;

FIG. 2 is a perspective view of a battery of the present invention having a battery-strength tester;

FIG. 3 is a vertical, sectional view along lines 3—3 of FIG. 1 of a typical indicator cell;

FIG. 4 is a top plan view of a battery-strength indicator device;

FIG. 5 is a vertical, sectional view along line 5—5 of FIG. 4;

FIG. 6 is a vertical, sectional view of a switch of the present invention with the switch in the "off" position;

DESCRIPTION OF THE PREFERRED EMBODIMENTS

Figure 7:
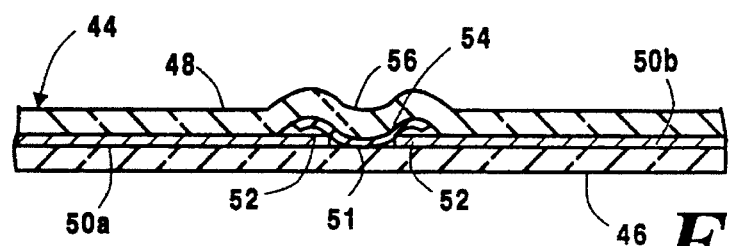
FIG. 7 is a vertical, sectional view of the switch of FIG. 6 with the switch in the "on" position.

Referring to FIG. 1, a battery-strength tester device 10 of the present invention is illustrated. The tester device has an indicator chamber, cell or bubble 12 and switch 24 formed in strip 16. Preferably the cells and switches of the present invention are sealed cells. Conductive layers 14 run the length of the strip into the indicator bubble to form spaced apart electrodes. The indicator bubble contains an indicating material 17 which undergoes a visible change (e.g., changes color, emits light, etc.) when the voltage potential across the indicator cell exceeds a predetermined value. At least one side of the strip 16 is transparent or translucent. The switch is in an "off" position, and, thus, the indicator device is only actuated when the switch is "on", thus preventing a constant drain on the battery.

The improved battery 18 of the present invention is illustrated in FIG. 2. The battery has an anode 20 and a cathode at its base (not shown). The tester device 10 is attached to the side of the battery, with the ends of the device connected to the anode 20 and the cathode.

Referring to FIG. 3, a typical indicator device 10A which can be used in the present invention comprises a first layer 30, a second layer 32, and a conductive layer or lead 14 sandwiched between the first and second layers. The end of the conductive leads extend into the indicator chamber or cell 12, which is filled with an indicator material 33. The ends of the conductive leads form electrodes 36. The second layer of the device of FIG. 3 is formed with a bulge 37 which forms one side of the cell. The other side of the cell is formed by the first layer. The first layer can be a clear material, a translucent material, or an opaque material. The second layer is preferably a clear or translucent material. The first layer can be an opaque material as long as the bulge area is clear or translucent. If the first layer is opaque, the inner side 31 of the first layer can be coated with a reflective material such as aluminum or aluminum foil, or a highly reflective white material to enhance visibility of the indicator material.

The indicator material can be any material that will undergo a visible change, such as a color change, when the voltage potential across the electrodes exceeds or drops below a predetermined voltage. For example, the material can be a redox composition, such as the composition in the U.S. Pat. No. 1,497,388, or the compositions disclosed by H. A. Fales and F. Kenny, INORGANIC QUANTITATIVE ANALYSIS, 1939, pp. 391–393, or the like. Alternatively, the composition can be a liquid-crystal composition, such as one of the compositions disclosed in Kirk-Othmer, ENCYCLOPEDIA OF CHEMICAL TECHNOLOGY, 3rd Ed., John Wiley & Sons, Vol. 7, pp. 724–751 and Vol. 14, pp. 395–427.

The voltage color-indicating device comprises a sealed cell having at least one transparent or translucent window. The cell is filled with an aqueous or non-aqueous composition, such as an aqueous phenolphthalein solution. Two spaced-apart electrodes of the cell are in contact with the color-indicating solution. When a voltage potential is induced across the electrodes, a redox reaction occurs which can cause a color change in the color-indicating solution. Each solution has its own unique threshold voltage wherein the redox reaction will commence. If the voltage of the battery is below that threshold voltage, no redox reaction will occur and there will be no color change.

An alternative embodiment of a battery-strength indicator device 10B which can be used in the present invention is illustrated in FIGS. 4 and 5. The indicator device 10B has a first layer 30, and a second layer 32a, and conductive leads or layers 14 sandwiched therebetween connected to electrodes 36. The second layer 32a has a depression or cavity 38 (filled with an indicator material 34) which defines one side of the indicator cell 12; the other side of the cell being defined by the inner surface 31 of the first layer 30. The cavity is illustrated with curved surfaces, it can also have straight sides arranged in perpendicular or non perpendicular fashion. One or both of the layers are transparent or translucent. Although the drawing illustrates the layers as being relatively thick, in actual practice the layers for the various indicators and of the switches of the invention can be quite thin, such as 1 or 2 mils, with a height or depth of usually 0.5 or 1 mil.

One embodiment of the switch 44 of the present invention is illustrated in FIGS. 6 and 7. The switch 44 has a base layer 46 and a resilient top layer 48, which is attached to the base layer. Conductive leads or layers 50a and 50b are sandwiched between the two layers and form switch contacts 52 which are separated by spacing 51. A portion of the top layer is bulged out to form a bubble element 56. A conductive strip or coating 54 comprising a shape memory alloy such as that marketed under the trademark "BioMetal" is attached to the inner side 55 of the bubble element. The bubble element is biased away from the base layer 46 as shown in FIG. 6 so that the conductive strip or coating does not come in contact with the spaced apart switch contacts 52. Thus, the switch is normally biased in the "off" position. When the bubble element is pressed downwardly towards the base layer as shown in FIG. 7, the conductive strip 54 is plastically deformed so that it contacts the switch contacts 52; thus bridging the contacts and permitting current flow across the contacts between the conductive leads or layers 50a and 50b, as illustrated in FIG. 7. The conductive strip 54 has sufficient resistance so that it heats up as the current passes through it. The strip 54 is sized in relation to the current flow such that when a particular temperature or interval is reached sufficient to activate the shape memory effect, the conductive strip 54 reverts to its original undeformed shape and the bubble element biases away from the base layer, breaking contact between the two switch contacts 52.

Figure 8:
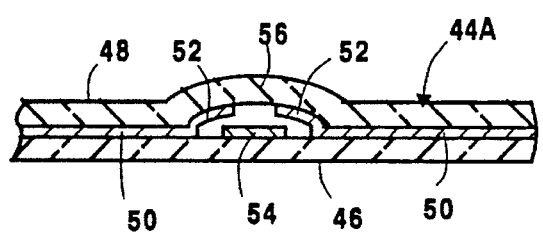
FIG. 8 is a vertical, sectional view of an alternative switch of the present invention.

An alternative embodiment of the switch 44A of the present invention is illustrated in FIG. 8. This switch has a base layer 46, a resilient top layer 48, and conductive leads or layers 50 sandwiched between the two layers. The top layer is bulged out to form a bubble element 56. The spaced apart switch contacts 52 are made of shape memory alloy and are located on the inner sides of the bubble element. A conductive strip 54 or coating is attached to the inner side of the base layer 46. This switch operates in the same manner as does the switch of FIGS. 6 and 7. The bubble element is depressed to deform and permit the switch contacts 52 to make contact with the conductive strip 54; thus, electrically bridging the two contacts. When a particular temperature or interval is reached the shape memory alloy reverts to its original undeformed shape and the bubble element biases away from the conductive strip; thus, breaking electrical contact between the switch contacts and the conductive strip.

Figure 9:
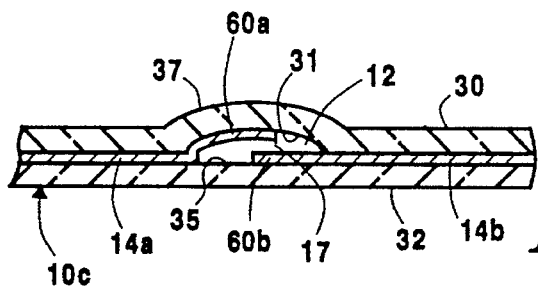
FIG. 9 is a vertical, sectional view of an alternative embodiment of a battery-strength tester of the present invention.

An embodiment of a combined single cell (indicator and switch) battery-strength tester device of the present invention is illustrated in FIG. 9. The device 10C has a first layer 30 and a second layer 32. Conductive layers 14a and 14b are independently and separately sandwiched between the first and second layers on the left and right sides respectively of the device. A portion of the first layer is formed into a bulge 37 to form the indicator cell 12. A shape memory alloy plate 60a is attached to the inner surface 31 of the top layer within the cell and is electrically connected with conductive layer 14a. A second plate 60b is attached to the inner side 35 of the second layer 32 within the indicator cell and is electrically connected to the conductive layer 14b. 60b may be a shape memory alloy. The indicator cell is filled with an indicator material 17, such as material described herein. At least one of the layers and its attached plate are transparent or translucent (or one of the layers is transparent or translucent and its attached plate is extremely thin) so that changes to the indicator material are visible upon depressing bubble 37 to make contact between the switch contacts 60a and 60b. When a particular temperature or interval is reached the switch contact 60a reverts to its original shape and the bubble element biases away from the base layer, breaking contact in the switch.

Figure 10:
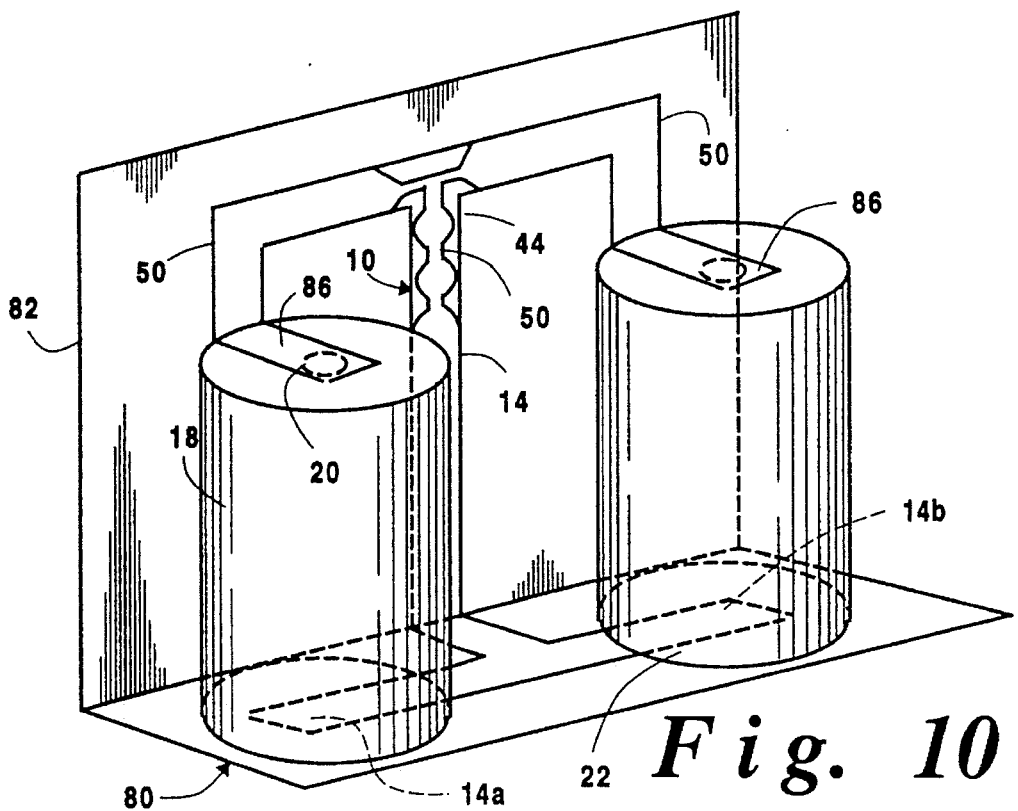
FIG. 10 is a perspective view of the battery packaging of the present invention having a battery-strength tester device.
Figure 11:
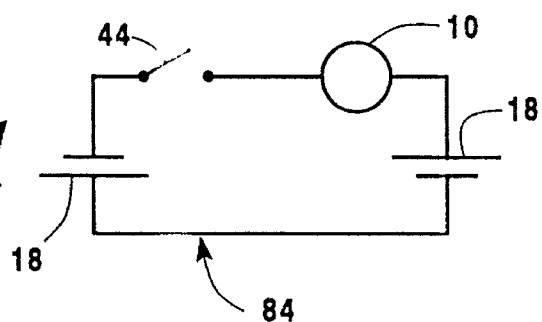
FIG. 11 is a schematic diagram of the battery packaging circuitry of the present invention having a battery-strength tester device.

Another embodiment of the invention is shown in FIGS. 10 and 11. A battery package 80 comprises two batteries 18 mounted on a package frame 82. Conductive leads 14a and 14b are affixed to the base of the frame in electrical contact with the cathode 22 of the battery. A conductive lead 14 connects the leads 14a and 14b with a battery strength-indicator 10, such as the ones described herein. A conductive layer 50 connects the indicator 10 with a switch 44 which in turn is connected to a conductive T-connection 86. Switch 44 after activation automatically turns off after a predetermined interval or temperature is reached. The T-connection is electrically connected to the battery anodes 20 via conductive layer 50 and conductive flaps 86. The package is intended to be covered with a transparent cover giving physical access to the switch 44 and visual access to the indicator 10. In the embodiment of FIG. 10 the batteries are in parallel. FIG. 11 illustrates the circuitry of a battery package containing two batteries that are connected in series to the switch 44 and indicator 10.

In the preferred embodiment the conductive leads, switch and indicator are layers attached to the package frame. The conductive leads may be printed or silk screened directly on the package frame. The package frame can be the base nonconductive layer for the switch 44 and indicator 10.

Figure 12:
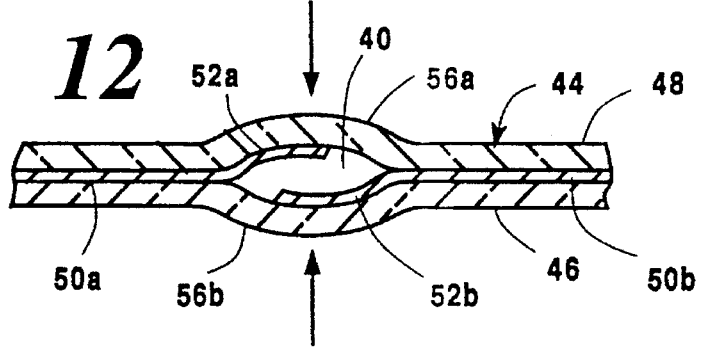
FIG. 12 is a vertical, sectional view of an alternative embodiment of the switch of the present invention.

Another embodiment of the switch 44 of the present invention is illustrated in FIG. 12. The switch has a base layer 46 and a top layer 48, which is attached to the base layer. Conductive leads or layers 50a and 50b are sandwiched between the two layers. The conductive layer 50a on the left side of the device is formed into switch contact 52a in chamber 40 and the conductive layer 50b on the right side of the device is formed into switch contact 52b in the chamber. Switch contact 52a and/or 52b are a shape memory alloy. A portion of the top layer and bottom layer are bulged out to form bubble elements 56a and 56b. The bubble elements are biased away from each other so that the switch contacts do not come in contact. Thus, the switch is normally in the "off" position. When the bubble elements are pressed together as shown by the arrows in FIG. 12, the switch contacts deform and come in contact permitting current flow across the contacts and the conductive leads or layers 50a and 50b. When a particular interval or temperature is reached, the bubble elements undeform and bias away from each other, breaking contact between the two switch contacts.

Figure 12A:
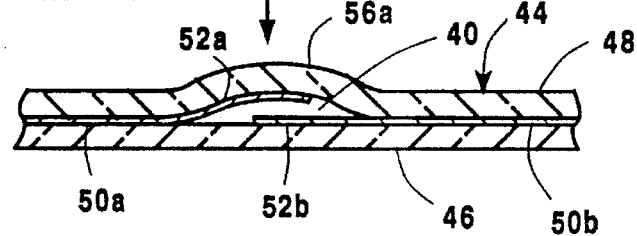
FIG. 12A is a vertical sectional view of a switch of the present invention with the switch in the "off" position.
Figure 12B:
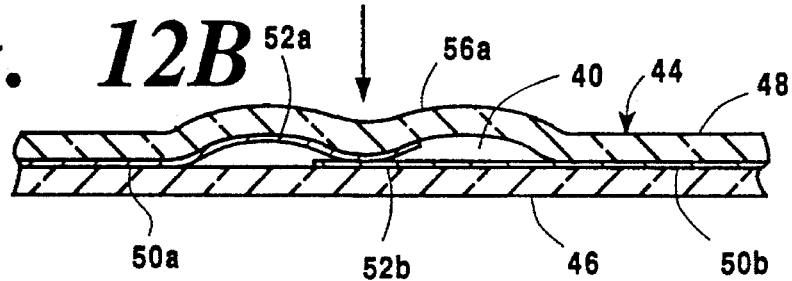
FIG. 12B is a vertical view of the switch of FIG. 12A with the switch in the "on" position.

Another switching embodiment 44 of the present invention is shown in FIGS. 12A and 12B. The switch has a base layer 46 and a top layer 48, which is attached to the base layer. Conductive leads or layers 50a and 50b are sandwiched between the two layers. The leads may be a shape memory alloy and in this switch the conductive layer 50a is a shape memory alloy and is formed into switch contact 52a in chamber 40. The conductive layer 50b is formed into switch contact 52b in the chamber. A portion of the top layer is bulged out to form bubble element 56a. The switch contacts 52a and 52b are shown biased away from each other so that the switch is in the off position. When the bubble element is pressed as shown by the arrow in FIG. 12B the switch contacts come in contact permitting current flow across the contacts and the conductive leads or layers 50a and 50b. When a particular temperature or interval is reached, the switch contact 52a reverts to its original undeformed shape (as shown in FIG. 12A), breaking the contact and turning the switch off.

The present invention permits the user of a battery to quickly determine whether the capacity of the battery is above or below a given point without the use of a voltmeter and/or ammeter. The approximate capacity of a battery can be determined by the battery's no load output voltage. The indicator device of the present invention can be fabricated so that it indicates a particular no-load voltage threshold. For example, one can select a voltage threshold which is indicative that the battery is about 20% exhausted, or about 50% exhausted-whatever is suitable for the intended purpose.

Another indicator useful with the switches of the invention is one having a liquid-crystal composition comprises a sealed, fully-enclosed cell containing the liquid-crystal composition. Preferably, one side of the cell will be transparent, and not merely translucent. The base layer of the liquid-crystal indicator call can be a high-dielectric material, optionally coated with a dielectric mirror in contact with the liquid-crystal composition. The top layer is preferably transparent and, optionally, has a transparent, conductive coating applied to the surface in contact with the liquid-crystal composition. A voltage differential is induced across the liquid-crystal composition to either the base high-dielectric material or the high-dielectric transparent top layer to induce an electric field. An electric field change can cause changes in the optical properties of liquid crystals, such as when a liquid crystal changes from a nematic phase to a smectic phase. Such field are easily achieved, even with small voltage inputs from batteries, by employing a high-dielectric base material and/or a high dielectric top layer material. Thus, when the liquid-crystal detector of the present invention is in a non-energized state, it will have one optical appearance characteristic of the 'at rest' phase of the liquid crystal. When the indicator device is activated, and a field is generated across the liquid-crystal composition, the liquid-crystal composition will transform into another phase. Alternatively, the indicator can remain in an "always on" condition and provide a constant indication of battery strength. If batteries do not have sufficient voltage to achieve the threshold high-dielectric field, thereby changing the liquid-crystal composition from one phase to the other, no change will be observed. Thus, each liquid-crystal indicator cell will be tailored by controlling the thickness of the dielectric material in the sandwich, the distance between the plates or electrodes, and the dielectric composition. Typical liquid-crystal compositions that can be employed include methoxybenzylidenebutylaniline and terephthal-bis-p-butylaniline.

Figure 13:
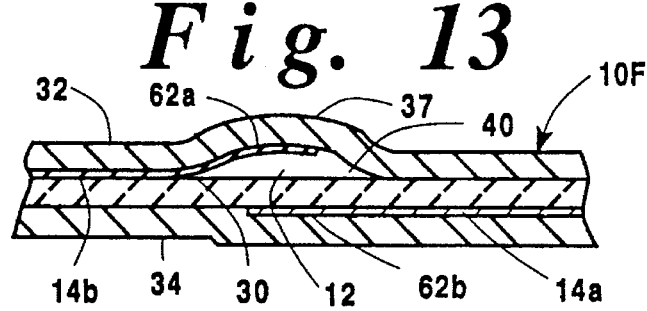
FIG. 13 is a vertical, sectional view of another embodiment of a battery-strength indicator device useful with the present invention.

In the indicator device of FIG. 13, the electrodes 62b and 62a are independently and separately sandwiched between the first high dielectric constant layer and the third nonconductive layer 30 and 34 and the first layer and second nonconductive layers 30 and 32, respectively. A bulge extending outwardly from the first layer is formed in the second layer to form an indicator cell 40. Within the cell on the inner side of the second layer 32 is a conductive plate 62a electrically connected to lead 14b. Plate 62b is positioned below the indicator cell between the first and third layers and is electrically connected to conductive layer 14a. The indicator cell 12 is filled with a liquid-crystal composition 40. The second layer and plate 62a and/or the first and third layers and plate 62b are transparent or translucent so that changes to the liquid-crystal composition 40 are visible. The bottom of the chamber can include a highly reflective coating or the like to enhance observation of the changes to composition 40. It should be appreciated that any switch indicator material may be used in the indicator cell of FIG. 13 or any other cell design. For example, a light emitting material may be used which is activated by heat, current flow, voltage differential, etc., and combinations thereof.

Other constructions of battery strength indicators and control switches are contemplated within the scope of this invention. For example, an indicator can be fabricated with conductive top and base layers which sandwich a nonconductive layer. A cell is formed between the top and bottom layers as described herein. The nonconductive layer does not extend into the cell; this layer, however, does electrically insulate the top layer from the bottom layer. The cell is filled with an indicator material as described herein and the top and bottom layer are independently adopted to be connected to different poles of a battery. The top and/or bottom layer are transparent or translucent.

The present intention can be used with a dry cell battery or with a wet-cell battery and with both rechargeable and non rechargeable batteries, such as alkaline, zinc, or nickel cadmium batteries. However, for purposes of convenience, the invention has been described herein with respect to a dry-cell battery.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A battery having a battery strength tester having indicator and switching means comprising:

a battery having a first terminal and a second terminal;

a battery indicator attached to a side of said battery which undergoes a visible change when an electric current flows through the indicator and a first conductive lead electrically connected between said indicator and said first battery terminal; and a battery switch which switch when activated stays in the activated, on position for an interval during which interval there is provided an indication of the strength of the battery, which switch is disposed over the side of said battery, a second conductive lead extending from said switch to the indicator, said portion of said second conductive lead within said switch comprising a switch contact, comprising a shape memory alloy, and a conductive layer in said switch forming a switch contact and in electrical contact with said second battery terminal, said battery switch being in an electrically open position, whereby after activation of the switch to turn the switch on by electrically connecting the conductive layer and the second conductive lead so that the indicator will be placed in electrical contact across the terminals of the battery for indicating the strength of the battery, the switch automatically turns off after the interval is reached and the strength indicated, the switch automatically reverting to its open position by breaking the electrical contact across the battery terminals.

2. A battery having a battery strength tester having indicator and switching means comprising:

a dry cell battery having a first terminal and a second terminal;

a battery indicator formed in a layer attached to a side of said battery which undergoes a visible change when an current flows through the indicator and a first conductor electrically connected between said indicator and said first battery terminal; and a battery switch comprising a resilient, nonconductive, deformable layer disposed over the side of said battery, a switch chamber formed beneath said resilient layer, and a second conductor extending from said chamber and connected to the indicator, said portion of said second conductive lead within said switch chamber comprising a switch contact comprising a shape memory alloy, and a conductive layer spaced apart from said switch contact and in electrical connection with said second battery terminal, said battery switch being in an electrically open position, whereby upon pressing of the resilient layer over said switch chamber, the switch contact will be deformed and placed in electrical contact with the conductive layer in electrical contact with said second battery terminal, thereby placing the indicator in electrical contact across the terminals of the battery and after the pressure is released, the switch stays in electrical contact for a predetermined interval or temperature during which interval the strength of the battery is indicated, after which the shape memory alloy reverts to its original undeformed shape and automatically breaks the electrical contact across the battery terminals.

3. A battery having a battery strength tester having indicator and switching means comprising:

a dry cell battery having a first terminal and a second terminal;

a battery indicator attached to a side of said battery which undergoes a visible change when current flows through the indicator and a first conductor electrically connected between said indicator and said first battery terminal; and a battery switch comprising a resilient, nonconductive, deformable layer disposed over the side of said battery, a switch chamber formed beneath said resilient layer, a second conductor extending from one end of said chamber and connected to the indicator, and a third conductor extending from the other end of said chamber to said second battery terminal, said conductor being separated so that the battery switch is biased in an electrically open position, with at least one of the second conductor or third conductor comprising a shape memory alloy, whereby upon pressing of the resilient layer over said switch chamber at least one of the second conductor or third conductor is physically deformed and the two conductors contact turning the switch on placing the indicator in electrical contact across the terminals of the battery and after the pressure is released, the switch stays in electrical contact for an interval or temperature during which interval the strength of the battery is indicated, after which the shape memory alloy reverts to its original undeformed shape and automatically breaks the electrical contact across the battery terminals.

4. The battery of claim 3 wherein said resilient layer is transparent about the chamber.

5. The battery of claim 3 wherein said resilient layer is translucent about the chamber.

6. The battery of claim 3 wherein said indicator comprises a chemical redox composition which changes color when a voltage potential across the indicator crosses a voltage.

7. The battery of claim 3 wherein said indicator comprises a liquid-crystal composition which changes phases when the electric field across the indicator exceeds a value.

8. The battery of claim 3 wherein said indicator comprises a LED which undergoes a visible change when the voltage applied to the indicator crosses a value.

9. The battery of claim 3 wherein said indicator comprises a thermochromic material which changes color when the temperature in the indicator changes to a value.

10. The battery of claim 3 wherein said indicator comprises a material which becomes illuminated when the switch is on.

11. The battery of claim 10 wherein the material is a phosphor in an epoxy binder.

12. A battery package having a battery-strength tester having indicator and switch means comprising:
   a package frame;
   at least one battery mounted on said package frame, said battery having first and second terminals;
   a battery-strength indicator mounted on said package frame and electrically connected to said first terminal of said battery; and
   a battery switch which when activated stays in the activated, on position for an interval during which interval there is provided an indication of the strength of the battery, which switch is disposed over said package frame and electrically connected to said second terminal of said battery and said indicator, said battery switch comprising a shape memory alloy being in an electrically open position,
   whereby after the switch is activated to turn the switch on and said indicator is placed in electrical contact across the terminals of said battery the switch stays in electrical contact until the interval or temperature is reached during which interval the strength of the battery is indicated, after which interval the switch automatically turns off and reverts to its open position by breaking the electrical contact across the battery terminals.

13. A battery package having a battery-strength tester having indicator and switching means comprising:
   a package frame;
   at least one battery mounted on said package frame, said battery having first and second terminals;
   a battery-strength indicator mounted on said package frame and electrically connected to said first terminal of said battery; and a battery switch comprising a resilient, nonconductive layer disposed over said package frame, a switch chamber formed beneath said resilient layer, a first conductor extending from one end of said chamber and connected to said indicator, and a second conductor extending from the other end of said chamber and connected to said second terminal of said battery, said first conductor and second conductor forming switch contacts which are biased in an electrically open position, with at least one of the conductors comprising a shape memory alloy,
   whereby upon pressing of the resilient layer over said switch chamber at least one of the first conductor and second conductor is physically deformed and, the first conductor and second conductor contact and place said indicator in electrical contact across the terminals of said battery for indicating the strength of the battery and after the pressure is released, the switch slays in electrical contact until an interval or temperature is reached during which interval the strength is indicated, after which interval the shape memory alloy reverts to its original undeformed shape and automatically breaks the electrical contact across the battery terminals.

14. An electrical switch for a battery strength tester comprising:
   a base;
   a resilient, nonconductive top layer attached to the base, a portion of the base and top layer forming a chamber having two spaced apart internal opposing walls;
   a first electrical contact on one of the internal walls of the chamber;
   a second electrical contact on the other internal wall of the chamber with at least one of the contacts comprising a shape memory alloy; and
   first and second conductors independently and separately sandwiched between the top layer and base and connected respectively to the first and second contacts, the top layer about the chamber adapted to be pushed toward the base so that at least one of the first and second contacts are physically deformed and come in contact to permit current flow from the first conductor to the second conductor and after the pressure is released, the switch stays in electrical contact until an interval or temperature is reached during which interval the strength of the battery is indicated, after which interval the shape memory alloy reverts to its original undeformed shape and automatically breaks the electrical contact across the battery terminals.

15. An electrical switch for a battery strength tester comprising:
   a base;
   a resilient, nonconductive top layer attached to the base, a portion of the base and top layer forming a chamber having two spaced apart, internal opposing walls;
   first and second spaced apart conductive contacts on one of the internal walls of the chamber;
   a third conductive contact on the other internal wall of the chamber comprising a shape memory alloy; and
   first and second conductors independently and separately sandwiched between the top layer and base and connected respectively to the first and second conductive contacts, the top layer about the chamber adapted to be pushed toward the base so that the third conductive contact is physically deformed and comes in contact with the first and second conductive contacts to permit current flow from the first conductor to the second conductor and after the pressure is released, the switch stays in electrical contact until an interval or temperature is reached during which interval the strength of the battery is indicated, after which interval the shape memory alloy reverts to its original undeformed shape and automatically breaks the electrical contact across the battery terminals.

* * * * *

UNITED STATES PATENT AND TRADEMARK OFFICE
CERTIFICATE OF CORRECTION

PATENT NO. : 5,478,665
DATED : December 26, 1995
INVENTOR(S) : James R. Burroughs and Alan N. O'Kain It is certified that error appears in the above-identified patent and that said Letters Patent is hereby corrected as shown below:

IN THE CLAIMS:

Claim 2, Column 12, Line 39: delete "predetermined" and insert
-- an --.

Signed and Sealed this

Twenty-third Day of July, 1996

Attest:

BRUCE LEHMAN

Attesting Officer     Commissioner of Patents and Trademarks